UNITED STATES PATENT OFFICE.

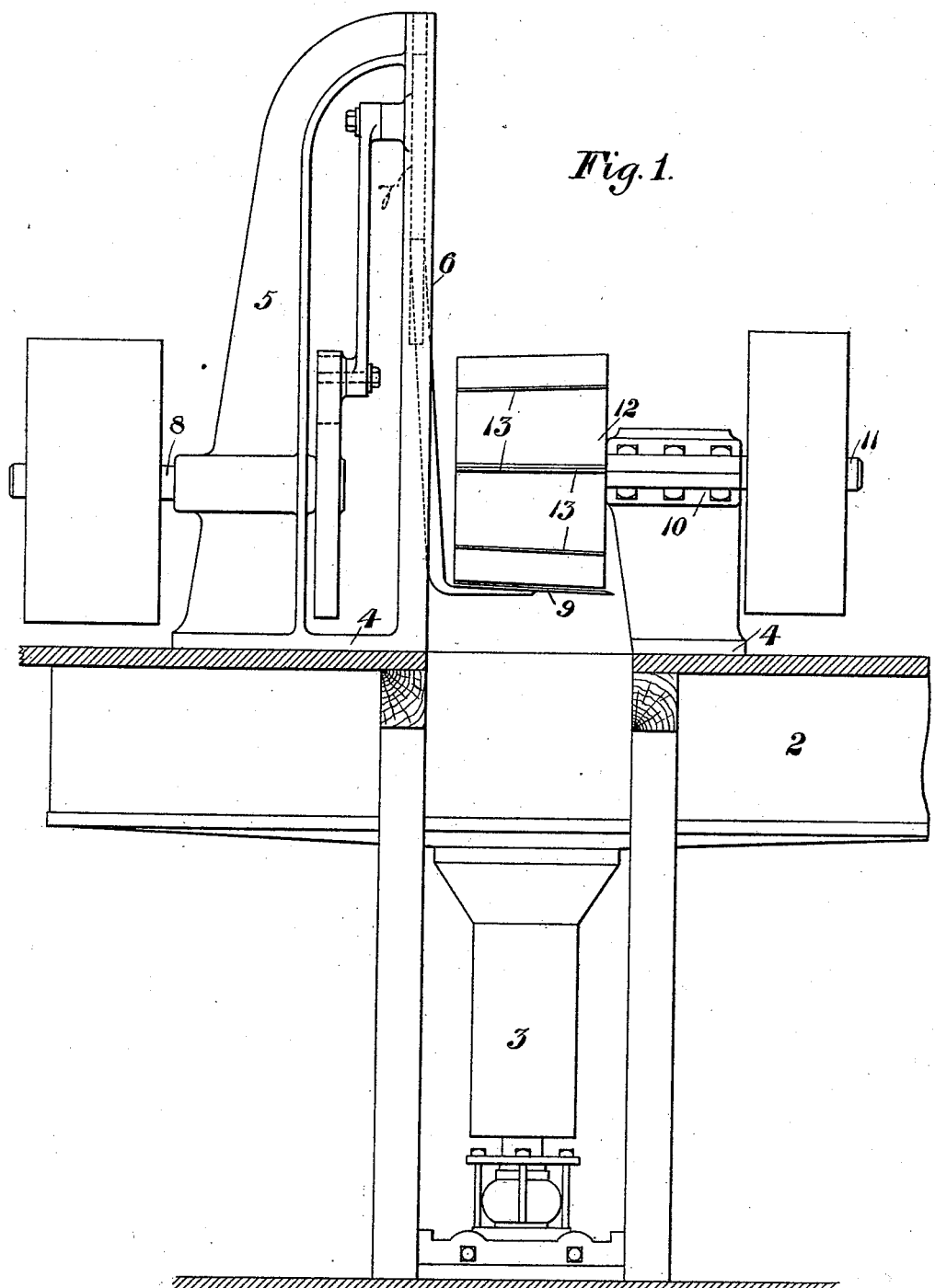

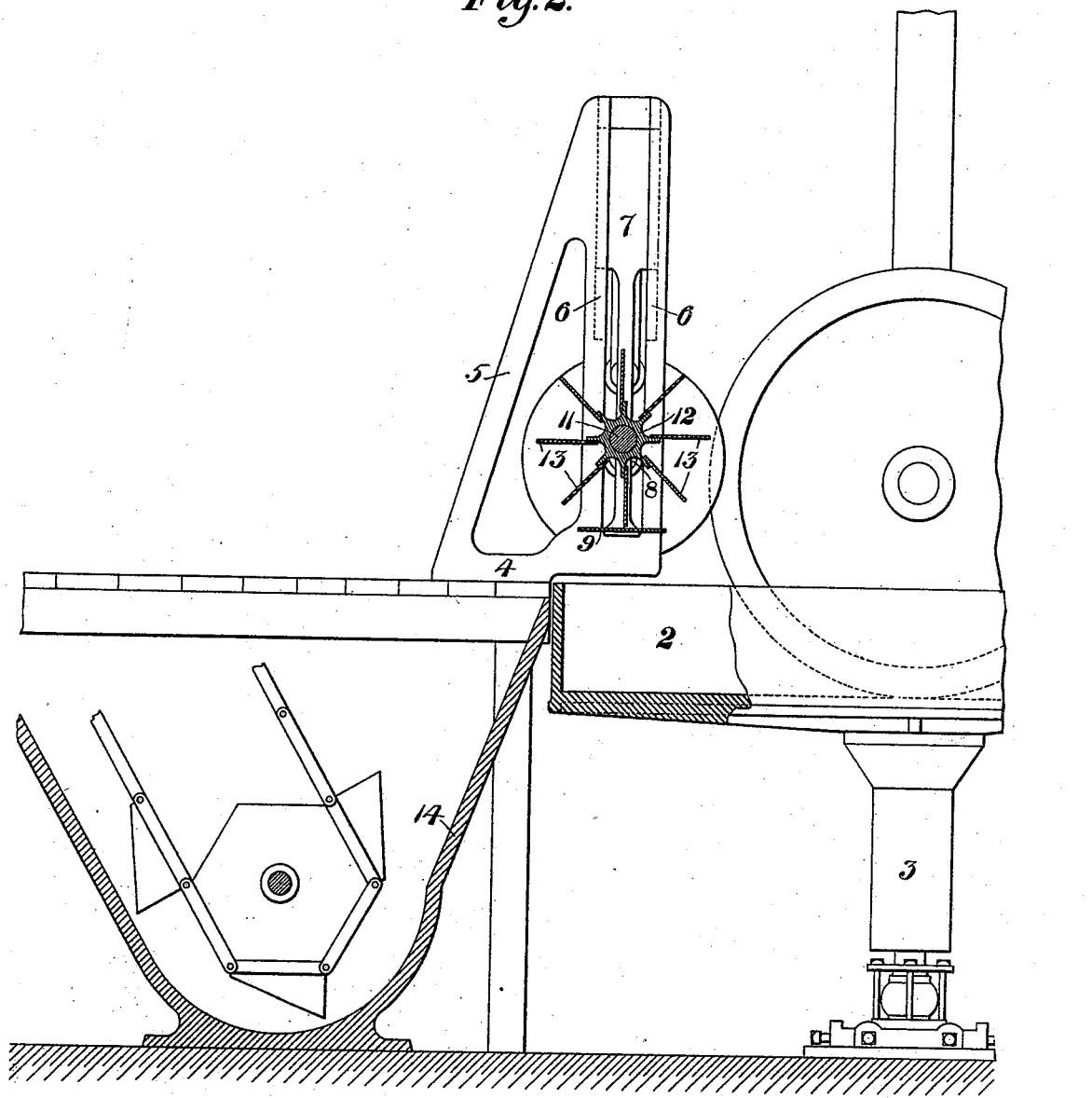

WILLIAM G. STEVENSON, OF WELLSVILLE, OHIO, ASSIGNOR TO STEVENSON & CO., OF SAME PLACE.

PAN-EMPTYING MACHINE.

SPECIFICATION forming part of Letters Patent No. 499,366, dated June 13, 1893.

Application filed October 20, 1892. Serial No. 449,512. (No model.)

*To all whom it may concern:*

Be it known that I, WILLIAM G. STEVENSON, of Wellsville, in the county of Columbiana and State of Ohio, have invented a new and useful Improvement in Pan-Emptying Machines, of which the following is a full, clear, and exact description, reference being had to the accompanying drawings, in which—

Figure 1 is a front elevation of my improved pan-emptying machine, partly in section; and Fig. 2 is a side elevation of the same, partly in section.

My invention relates to that class of grinding apparatus wherein a rotary pan carrying rollers is employed, and is designed to produce an efficient apparatus for automatically removing the pulverized material from the pan, thus doing away with the tedious hand-labor heretofore employed.

In the drawings, 2 indicates the rotary pan which is supported upon the central-shaft 3, and is actuated thereby, as ordinarily.

At one side of the pan and supported upon the base 4, is a frame 5 projecting over the outer portion of the pan, and having on its outer face vertical guide-ways 6, 6, between which moves a slide 7. This slide is vertically reciprocated from the driven shaft 8 by a suitable means, such as the crank and connecting rod shown, though a cam or eccentric may be employed for the purpose without departure from my invention.

Secured to the lower end of the slide 7 is a projecting shovel 9, which extends at right angles to the slide and is raised and lowered thereby. Secured to another portion of the base 4, independently of the frame 5, is a bearing 10 for a shaft 11 carrying at its end a scraper-wheel 12, consisting of a series of flat blades 13, projecting radially from the shaft as shown.

Directly under the outer edge of the scraper blades is an inclined chute 14 leading into a reservoir, whence the material is lifted by the elevator buckets and taken to the point desired.

The crank is set in a slot, as is also the pivot-pin of the slide, so that the movements of the shovel can be nicely regulated and the bearing for the scraper-shaft may be made adjustable so that its angle relatively to the shovel may be changed to shove the material in different directions therefrom, as desired.

The action of the device is obvious. When the shovel is lowered, the rotating pan fills the same with ground material, and as it rises the scraper removes the same and moves it into the reservoir.

The device is simple, strong, and does the work of several men automatically, one man taking care of several pans, where before two or more men were necessary to each pan.

Many variations may be made in the form and arrangement of the various parts without departure from my invention, which I regard as lying broadly in the reciprocating shovel together with means for scraping the material therefrom.

I claim—

1. The combination with a rotary pan, of a shovel carried thereon, means for vertically reciprocating the same, and automatic means for scraping off the shovel when raised above the pan; substantially as and for the purposes described.

2. The combination with a rotary pan, of a vertically reciprocating slide thereon, a shovel connected thereto, and a rotary scraper arranged to scrape off the shovel; substantially as and for the purposes described.

3. A pan-emptying machine, comprising a shovel, means for vertically reciprocating the same, and a shaft having radial blades arranged to scrape off the shovel; substantially as and for the purposes described.

In testimony whereof I have hereunto set my hand this 1st day of October, A. D. 1892.

WILLIAM G. STEVENSON.

Witnesses:
J. A. DEIDRICK,
K. MENOUGH.